United States Patent [19]

Dwyer

[11] 3,889,709

[45] June 17, 1975

[54] HYDRAULIC UNLOADING VALVE

[75] Inventor: Robert M. Dwyer, Livonia, Mich.

[73] Assignee: Massey-Ferguson Inc., Detroit, Mich.

[22] Filed: Mar. 25, 1974

[21] Appl. No.: 454,360

Related U.S. Application Data

[63] Continuation of Ser. No. 296,415, Oct. 10, 1972, abandoned.

[52] U.S. Cl. ...... 137/504; 137/505.13; 137/505.38; 417/299
[51] Int. Cl. .......................................... F16k 31/12
[58] Field of Search ........... 137/115, 117, 494, 497, 137/498, 503, 504, 505.13, 505.14, 505.38, 505.39; 417/299, 300

[56] References Cited
UNITED STATES PATENTS 1,907,162   5/1933   Webb ........................ 137/505.13 X
3,112,764   12/1963  Anderson et al. .................. 137/504
3,522,999   8/1970   Liles ............................... 417/299 X

FOREIGN PATENTS OR APPLICATIONS 372,851   5/1932   United Kingdom ............ 137/505.38

*Primary Examiner*—Alan Cohan
*Assistant Examiner*—Gerald A. Michalsky
*Attorney, Agent, or Firm*—Thomas P. Lewandowski

[57] ABSTRACT

The spool of a hydraulic unloading valve has orifice and bore means creating a resultant force on the spool that automatically shifts the spool on the flow of fluid from an open position to a closed position over the range of fluid viscosities to discontinue the diversion of fluid for a high pressure pump when a starting engine driving the pump attains the running speed.

5 Claims, 1 Drawing Figure

PATENTED JUN 17 1975    3,889,709
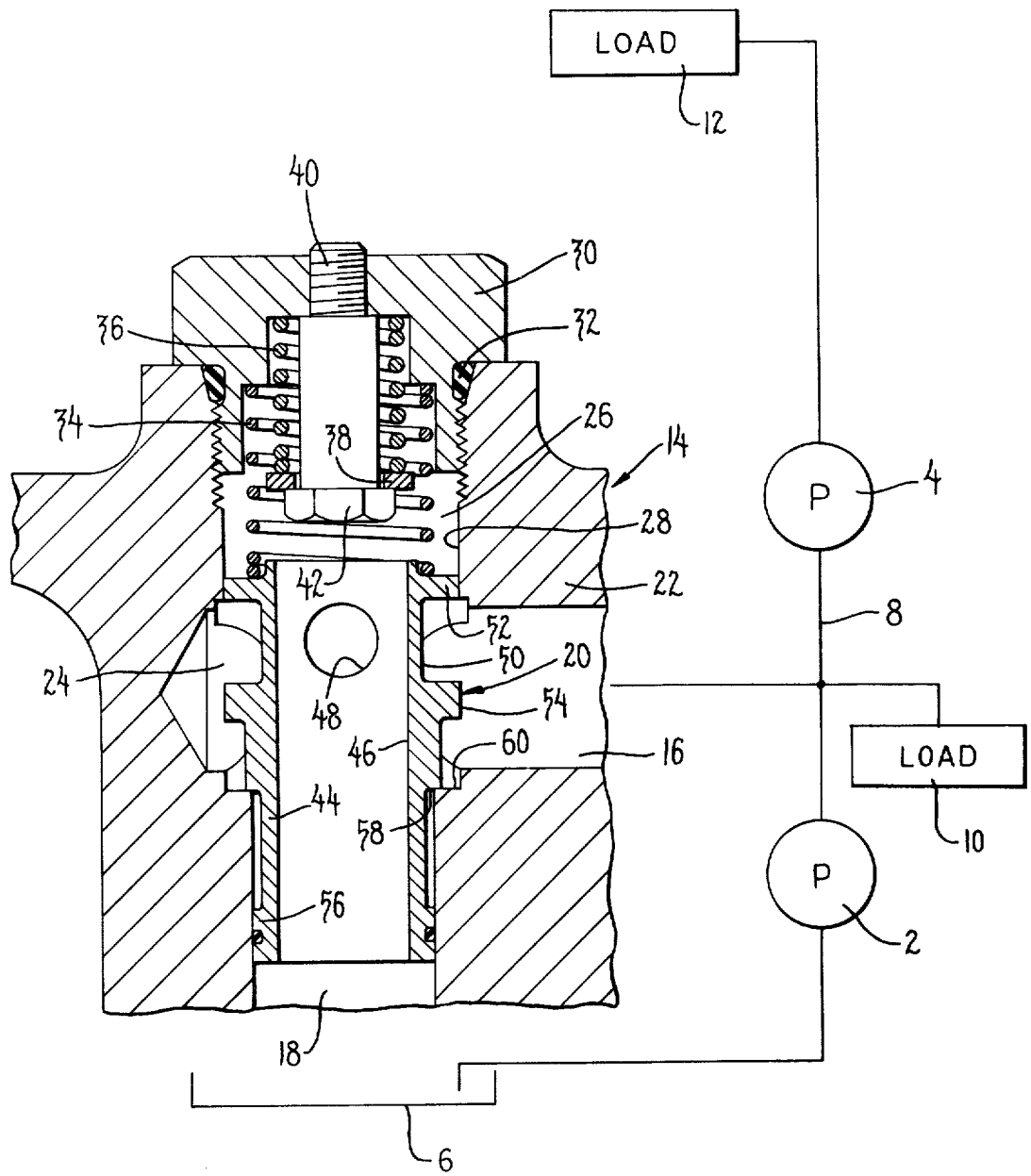

HYDRAULIC UNLOADING VALVE

RELATED APPLICATIONS

This application is a continuation of my co-pending application Ser. No. 296,415 filed on Oct. 10, 1972, now abandoned and entitled "Hydraulic Unloading Valve."

BACKGROUND OF THE INVENTION

In the starting of an internal combustion engine such as gasoline or diesel engines, it is desireable to relieve the engine of auxiliary loads in order that the engine may apply its power in establishing the running speed.

When running conditions are established the auxiliary equipment is connected to the engine. Auxiliary electrical equipment is readily disconnected by the starting switch and some mechanical equipment is connected through clutches which can be easily disconnected for starting purposes. Some mechanical equipment, however, is connected directly to the engine and cannot be mechanically disconnected. One of these components is the high pressure hydraulic pump supplying high pressure fluid to the steering mechanism, brakes, three point hitch and the external hydraulic implements. The pump operates when the engine is starting. The easiest manner of relieving the loading of the engine by the pump is to prevent the supply of hydraulic fluid to the pump.

The high pressure hydraulic pump is supplied with hydraulic fluid by a charging pump. The charging pump in addition to supplying the high pressure pump may in the case of a tractor also supply fluid to the clutch, PTO and the differential lock. The most convenient location for diverting of the supply of fluid to the high pressure pump is adjacent to the output of the charging pump. The valve is connected to the conduit leading to the high pressure pump and is normally set to divert the supply of hydraulic fluid to the sump. In order to stop this diversion, the spool of the valve is lifted to the closed position by the operator. In the present procedure for starting an engine, the valve remains in the open position while the engine is started and, when the engine attains its running speed, the operator closes the valve. This requires the direct attention of the operator and, if the operator forgets to close the valve there is no hydraulic power and in the case of a tractor, it does not have power for the steering mechanism or the brakes.

It has been the endeavor to make this operation automatic and not require the attention of the operator. The valve would remain open during starting and automatically close when the engine attains its running speed. The provision of a valve that automatically closes in response to the flow of the diverted fluid is complicated by the fact that the pressure drop across the spool of the valve is responsive to the viscosity of the fluid. The fluid has a wide range of viscosities. When the engine is warm, the fluid is hot and thin. When the engine has been idle and has been subjected to the cold, the fluid is thick and viscous. A valve that automatically closes when the fluid is hot does not automatically close when the fluid is cold. The unloading valve should automatically close whether the fluid is hot or cold when the engine attains the running speed.

OBJECTS OF THE INVENTION

An object of this invention is to provide a valve that remains open on starting of an engine and closes automatically when the engine attains running speed.

Another object of this invention is to provide an automatically closing valve that operates over a wide range of fluid viscosities.

Another object of this invention is to provide a valve that returns to the open position when the engine stops.

Another object of this invention is to provide a valve that automatically operates over the range of the viscosities of the fluid and is inexpensive and simple to manufacture.

These and other objects of this inventin will be apparent from the following description and claims taken in connection with the accompanying drawings which illustrate the various features of this invention.

SUMMARY OF THE INVENTION

In summary, this invention comprises a valve having a spool that has orifice means and axial bore means which are in series and on the flow of fluid therethrough in the open position creates a resultant force that moves the spool over the range of viscosities of the fluid to a closed position on the engine attaining a running speed.

DETAILED DESCRIPTION OF THE INVENTION

The description of this invention is in connection with an agricultural tractor engine. However, it may be used in other types of engines. The hydraulic systems of tractors includes a charging pump 2 and a main pump 4. The charging pump is mounted on the top cover of the rear casing or center housing (not shown) of the tractor and draws its supply of fluid from the bottom of the casing which acts as a sump, diagramatically indicated at 6, and delivers the hydraulic fluid to the high pressure pump 4 over the line 8. The charging pump 2 also delivers high pressure fluid to load means 10 as previously described.

The automatic unloading valve 14 has an inlet passage 16 connected to the line 8 from the output of the charging pump and the input of the main or high pressure pump. The valve has an outlet passage 18 which discharges to the sump 6. The inlet passage diverts the flow of fluid from the line 8 when the member or spool 20 is in the position shown in the drawing. The fluid flows through the spool into the outlet passage 18 to the sump. In the raised position of the spool 20 the input passage 16 is blocked and fluid is delivered to the main pump 4 by the charging pump 2 over the line 8.

VALVE

The valve has a housing 22 attached to the cover of the rear casing or center housing (not shown). The inlet passage 16 and the outlet passage 18 are cylindrical in shape and angled to one another and, in this embodiment, the passages are at right angles. The passages intersect to form chamber 24.

On the opposite side of the inlet passage 16 from the outlet passage or on the opposite side of chamber 24 from the outlet passage is a cylindrical recess 26 formed by the bore 28 and isolated from the inlet passage pressures by the spool. For the operation of the valve the recess 26 and bore 28 have a diameter greater than the outlet 18. The bore 28 is closed by the cap 30 threaded therein to form part of the housing 22. An O-ring 32 seals the cap 30. The members or spool 20 is held in the open position by the main spring 34 in the recess 26. The spring is positioned between the end of the spool and the cap 30. An auxiliary spring 36 is mounted on the cap 30 by the washer 38 and the bolt 40. The spool 20 engages the washer 38 at the end of its upward travel into the closed position compressing the spring 36 which provides an initial impetus to overcome the initial inertia of the spool on returning to the open position, as shown. When not engaged by the spool 20, the washer 38 rests on the head 42 of the bolt 40 under the pressure of the spring 36.

SPOOL

The spool 20 has a cylindrical wall 44 forming an axial extending cylindrical bore 46. The outlet passage 18, the bore 28 and the bore 46 are axially aligned. Orifices 48, of which only one is shown, extend through the upper part of the wall 44 to connect the bore 46 to the passage 16. The wall 44 is cylindrical in shape and the outside surface is of a smaller diameter than the chamber 24. This provides space for the fluid from the passage 16 to pass around the spool wall 44 in through the orifices 48 into the cylindrical bore 46 of the spool. The bore 46 extends the axial length of the spool and is open at the bottom for discharge and at the top to apply pressure drop caused by the flow of fluid in the bore.

The spool has a top flange 52 extending radially outward from wall 44 and having a sufficient thickness to form a sealing surface with the bore 28. The flange 52 remains in continuous contact with the bore 28 to form a sealing means to isolate the recess 26 from the pressures of the inlet passage 16. At the lower end the spool has a portion 56 sealing against the outlet passage 18. This continuous seal isolates the passage 18 from the inlet passage 16 except through the orifices 48 and the bore 46. Intermediate the flange 52 and the portion 56, the spool 20 has a third flange 54 extending radially from the wall 44. The flange 54 has the same diameter as the flange 52 and the bore 28. The orifice 48 is positioned between the flanges 52 and 54. When the spool moves to a closed position, the flange 54 forms a seal with the bore 28 to isolate the orifices 48 from the inlet passage 16 and stop the flow of fluid. In the open position, the spool 20 has a shoulder 58 resting on the ledge 60 of the housing.

OPERATION

An important feature of this invention is the interrelation of the pressures created by the orifices 48 and the bore 46. The fluid flows from the passage 16 around the spool in the annular groove 50 through the orifices 48 into the bore 46 down to the outlet passage 18. The pressure in the outlet passage 18 is nil since the fluid is flowing into the open casing. The flow of fluid through the orifice 48 and bore 46 creates a resultant force between the fluid in the passage 16 and the passage 18 which acts on the spool to lift the spool into the closed position on reaching a value greater than the compressive force of the main spring 34. This resultant force is the difference of the pressure produced by the pressure drop due to the bore flow applied to the top of the spool including the top of flange 52 and the pressure produced by the sum of the orifices and bore pressure drop applied to an area comparable to the difference between the diameter of the passage 18 and the bore 28. The top area of the spool is larger than this comparable area. These pressure drops vary with the viscosity of the fluid. The higher the viscosity of the fluid the greater the pressure drops, or as the viscosity lessens, the pressure drops lessen. The pressure drop of the bore reduces more than the pressure drop of the orifices as the flow increases. Although these pressure drops are changing, the combining of the bore pressure drop with the larger top area of the spool and deduction of the combining of the bore and orifice pressure drops with the comparable area results in a force on the spool. This force is dependent on the flow of fluid which is related to engine speed. At the idling speed, this force is sufficient to overcome the spring pressure and close the valve. This closing force occurs over the range of viscosities of the fluid but a slightly higher idling speed may be required at the higher viscosities than at lower viscosities. If the fluid is cold, the spool will tend to move to the closed position after the engine reaches the running condition and also, the spool will close on the engine reaching running condition when the fluid is warm and thin. The relationship of the pressure drops of the orifices 48 and the bore 46 can be set so that the movement of the spool to the closed position is dependent on the rate of flow of the fluid of the charging pump driven by the engine and thus relates the flow to engine speed. When the engine and charging pump attain the speed of desired operating condition, the flow will create a sufficient resultant force to move the spool 20 to a closed position thereby providing the main pump with fluid.

SUMMARY OF THE FEATURES AND ADVANTAGES OF THE INVENTION

It is thus seen that the unloading valve automatically operates over the operating conditions of the tractor. The operator does not have to remember to render the main pump operative. The parameters of the spool may be set so that it shifts to the closed condition whether the viscosity of the fluid is thick or thin. The high pressure pump is rendered inoperative when the engine has been standing in freezing weather all night or when the engine has been running on a hot summer day. One of the desirable characteristics is that when the engine is cold a greater running speed is required to shift the spool than when the fluid is less viscous. Under all conditions the operator's attention is not required to open and close the valve. When the engine is running smoothly for driving the tractor the spool is closed and the pump is operating. The operator will then have proper steering and braking without any thought to closing the valve.

While this invention has been described in connection with a single embodiment, it will be understood that this embodiment is capable of modification and that this is intended to cover any variations, uses or adaptations following in general, the principle of the invention as falls within the scope of the appended claims.

I claim:

1. A hydraulic unloading valve for the diversion of hydraulic fluid flow comprising a housing; an inlet in said housing, an outlet in said housing; a chamber in said housing connected to said inlet and said outlet; a recess on opposite side of said chamber from said outlet, a member being slideably mounted in said chamber for shifting between an open position for passing fluid from said inlet to said outlet and a closed position for blocking fluid flow; means for urging said member to the open position, characterized by said member having a resultant force creating means including orifice means for automatically moving said member to the closed position over a range of viscosities of the fluid, said member having a first continuous sealing means with said recess, a second continuous sealing means with said outlet and a third sealing means between said first and second sealing means, said orifice means is between said first and third sealing means to receive fluid in the open position and to be isolated from said inlet in said closed position, said third sealing means in a non-sealing relation in said open position and in sealing relation with the recess to block flow through said orifice means thereby preventing flow of fluid through the valve.

2. A hydraulic unloading valve for the diversion of hydraulic fluid flow comprising a housing; an inlet in said housing, an outlet in said housing; a chamber in said housing connected to said inlet and said outlet; a recess on the opposite side of said chamber from said outlet, a member being slideably mounted in said chamber for shifting between an open position for passing fluid from said inlet to said outlet and a closed position for blocking fluid flow; means for urging said member to the open position characterized by said member having a resultant force creating means including orifice means for automatically moving said member to the closed position over a range of viscosities of the fluid; said member having a wall with an axial bore for discharge of fluid; an orifice means through said wall to pass fluid for discharge of fluid to said outlet; said member having a first sealing means in continuous sealing relation with said recess to isolate the top of said member from inlet pressure, a second sealing means in continuous sealing relation with said outlet and a third sealing means between said first and second sealing means; means for urging said member to open position being a spring and providing a spring pressure; said orifice means is between said bore and said inlet and between said first and third sealing means; said third sealing means in non-sealing relation in the open position and moving into sealing relation on said member moving to the closed position; said orifice means creating a pressure drop on the flow of fluid in the open position to urge said member to the closed position; said bore creating a bore pressure drop on the flow of fluid therethrough to urge said member to the open position; said pressure drops producing a resultant force which is the combination of the sum thereof times an area comparable to the difference in area between the area of the recess and the area of the outlet less the bore pressure drop times the top area of the member; said member moving to the closed position when said resultant force exceeds said spring pressure, said third sealing means moving into sealing relation with said recess to isolate said orifice means from said inlet and stop the flow of fluid to said outlet thereby holding said member in the closed position under fluid pressure from said inlet.

3. A hydraulic valve as set forth in claim 2, wherein said spring means is in said recess to urge said member to the open position and force said member to the open position on the drop of the inlet pressure.

4. A hydraulic valve as set forth in claim 2, wherein said spring means includes a spring only providing an initial impetus for setting the member from the closed position.

5. A hydraulic unloading valve comprising a first cylindrical wall forming an inlet passage, a second cylindrical wall forming an outlet passage; a chamber connected to said inlet and outlet passages; a third cylindrical wall forming a recess axially aligned with said outlet passage on the opposite side of said chamber from said outlet passage and of a larger diameter than said outlet passage; a cylindrical sleeve-like member having orifice means and bore means in series and slideably mounted in said chamber and said outlet passage, said member extending through said chamber and moveable between an open position and a closed position; spring means in said recess to urge said member to the open position, said member having first sealing means in continuous sealing relation with said wall of said recess to isolate the top of said member from said inlet passage, a second sealing means in continuous sealing relation with said wall of said outlet passage and a third sealing means between said first and second sealing means; said third sealing means in a non-sealing relation in the open condition and moving into sealing relation with said recess wall when said member moves to the closed position; said bore means having a pressure differential on the flow of fluid therethrough; said orifice means being axially between said first and third sealing means and creating a pressure differential on the flow of fluid therethrough; said orifice means and bore means pressure differentials producing a resultant force which is the combination of the sum of the orifice means and bore pressure differentials times an area corresponding to the difference between the recess and the outlet passage areas less the bore pressure differential times the area of the top of the member whereby said resultant force moves said member against said spring means into said recess when the fluid flow attains a given value over the range of viscosities of the fluid.

* * * * *